United States Patent
Greenenko et al.

(10) Patent No.: US 12,138,646 B2
(45) Date of Patent: Nov. 12, 2024

(54) MICRO-NOZZLE HAVING AN INTEGRATED FILTER

(71) Applicant: TTP PLC, Royston (GB)

(72) Inventors: Alon Greenenko, Royston (GB); Arnau Perdigo-Oliveras, Royston (GB); Chung Man Cheung, Royston (GB); Daniel Geoffrey Tyler Strange, Royston (GB); Jianye Wang, Royston (GB); Pavel Kohout, Royston (GB); Robert Gordon Maurice Selby, Royston (GB)

(73) Assignee: TTP Plc, Royston (GB)

( * ) Notice: Subject to any disclaimer, the term of this patent is extended or adjusted under 35 U.S.C. 154(b) by 702 days.

(21) Appl. No.: 17/280,266

(22) PCT Filed: Sep. 30, 2019

(86) PCT No.: PCT/GB2019/052754
§ 371 (c)(1),
(2) Date: Mar. 26, 2021

(87) PCT Pub. No.: WO2020/065352
PCT Pub. Date: Apr. 2, 2020

(65) Prior Publication Data
US 2022/0001412 A1    Jan. 6, 2022

(30) Foreign Application Priority Data
Sep. 28, 2018 (GB) ...................... 1815944

(51) Int. Cl.
*B05B 15/40* (2018.01)
*B01D 29/01* (2006.01)
*B01D 29/50* (2006.01)

(52) U.S. Cl.
CPC .............. *B05B 15/40* (2018.02); *B01D 29/50* (2013.01); *B01D 29/01* (2013.01)

(58) Field of Classification Search
CPC ....... B05B 15/40; B05B 11/0005; B05B 1/02; B05B 1/14; B05B 1/34; B05B 1/00;
(Continued)

(56) References Cited

U.S. PATENT DOCUMENTS 5,994,696 A † 11/1999 Tai
7,896,264 B2 * 3/2011 Eicher .................. A61M 11/06
55/327

(Continued)

FOREIGN PATENT DOCUMENTS

EP         1493492 A1 *  1/2005  ............ A61M 11/06
WO         2018082699    † 5/2018
WO    WO-2018082699 A1 *  5/2018  ............ A61M 11/00

OTHER PUBLICATIONS

PCT Patent Application PCT/GB2019/052754 International Search Report and Written Opinion dated Nov. 26, 2019.
(Continued)

*Primary Examiner* — Christopher R Dandridge
(74) *Attorney, Agent, or Firm* — Erise IP, P.A.

(57) ABSTRACT

A micro-nozzle with an integrated filter structure for receiving fluids at pressures between 0.1 MPa to 50 MPa, comprising: at least one fluid inlet, a fluid outlet comprising at least one orifice, a primary filter structure positioned downstream from the at least one fluid inlet and arranged to provide statistical filtration of fluid passing therethrough.

17 Claims, 6 Drawing Sheets

(58) Field of Classification Search
CPC ........ B01D 29/50; B01D 29/01; B01D 29/52; B01D 46/62; A61M 11/003
See application file for complete search history.

(56) References Cited

U.S. PATENT DOCUMENTS 9,283,333 B2 * 3/2016 Schuy .................... A61M 11/00
2004/0159319 A1   8/2004 Kadel et al.

OTHER PUBLICATIONS

Great Britain Application 1815944.2 Combined Search and Examination Report dated Feb. 25, 2019.

* cited by examiner
† cited by third party

MICRO-NOZZLE HAVING AN INTEGRATED FILTER

RELATED APPLICATION

The present application is a national stage application under 35 U.S.C. § 371 of International Application No. PCT/GB2019/052754, filed 30 Sep. 2019, which claims priority to Great Britain Patent Application No. 1815944.2, filed 28 Sep. 2018. The above referenced applications are hereby incorporated by reference.

BACKGROUND

The present invention relates to a nozzle for aerosol systems. In particular, the present invention relates to a micro-nozzle with an integrated filter for preventing obstruction of the nozzle by contaminants in a fluid being aerosolised.

Mechanical systems for aerosolising fluids (typically liquids) are highly effective for delivering pharmaceutical ingredients to the lunge, nose, eyes, skin or mouth. The aerosols generated by such systems are generally monodisperse and more controllable than those produced by typical pump sprays. As such, delivery can be targeted with fast uptake while minimising undesirable effects such as uncontrolled droplet distribution at the start up and end of the droplet delivery.

Such aerosols rely on forcing a liquid at high pressures through micro-structured nozzles having apertures with hydraulic diameters of typically 0.2 mm or less. One of the key challenges in these systems is preventing the micro-nozzles from becoming blocked or obscured during operation. The term "micro-nozzle" may also encompass "micro-structured nozzles".

Examples of contaminants which commonly cause obstruction of the nozzle include manufacturing debris, component wear, formulation precipitation and/or agglomerates in formulations comprising particle suspensions. Any one of these factors could be a cause of a blocked nozzle during the life-cycle of an aerosol system. To ensure a reliable and safe functioning, the nozzles of mechanical aerosol systems can be provided with filters to prevent contaminants from causing a blockage.

Whilst outlet nozzles are typically manufactured separately from filtration components and assembled together to form nozzle-filter assemblies, modern manufacturing methods enable the manufacture of nozzles having integrated filters. However, the efficacy of such a filtration system is typically heavily dependent on the surface area available. As a result, systems designed for better filtration can be large, and it is difficult to provide a compact nozzle and filter system with a high quality filtration. Furthermore, as the system size is reduced, for example to microscopic scales, the cost of manufacturing and maintaining such filters can be high. Once a fine grain filter has been saturated, the filter cannot be reused, which means the whole micro-nozzle would typically have to be replaced with a new filter. Such a process can often be costly especially in microscopic scale systems.

The present invention seeks to address at least some of the above problems.

SUMMARY OF THE INVENTION

The present invention provides a micro-nozzle with integrated filter structure, which combines the advantages of statistical and absolute filtering approaches; larger filtering capacity per unit volume of statistical filter allows the filter dimensions and hence the manufacturing costs to be reduced.

Described herein is a micro-nozzle with an integrated filter structure for receiving fluids at pressures between 0.1 MPa to 50 MPa, comprising: at least one fluid inlet; a fluid outlet comprising at least one orifice; a primary filter structure positioned downstream from the at least one fluid inlet and arranged to provide statistical filtration of fluid passing therethrough, the primary filter structure comprising a plurality of first elements spaced apart a distance greater than the diameter of the at least one orifice of the outlet, wherein each of the first elements comprises a plurality of sub-elements which are spaced apart a distance less than the distance at which the first elements are spaced apart.

The micro-nozzle may further comprise a secondary filter structure positioned downstream of the primary filter structure. The secondary filter structure may be arranged to provide absolute filtration of fluid received from the primary filter structure prior to the fluid reaching the least one fluid outlet.

Further described herein is a micro-nozzle with an integrated filter structure for receiving fluids at pressures between 0.1 MPa to 50 MPa, comprising: at least one fluid inlet; a fluid outlet comprising at least one orifice; a primary filter structure positioned downstream from the at least one fluid inlet and arranged to provide statistical filtration of fluid passing through it; and a secondary filter structure positioned downstream of the primary filter structure and arranged to provide absolute filtration of fluid received from the primary filter structure prior to the fluid reaching the at least one fluid outlet.

Statistical and absolute filters are two commonly used approaches in filtration devices. A statistical filter would typically prevent most particles from going through, but a single particle passing the filter during the life time of the device can block the nozzle and jeopardize the operation of the device. An absolute filter would block all particles above a certain size. However, statistical filters have higher spatial efficiency trapping particles throughout the medium within the filter structure as opposed to capturing contaminants on a surface, which in turns enables a more compact design and improved cost efficiency.

The at least one fluid inlet may comprise a multi-channel inlet, preferably wherein the at least one fluid inlet provides an initial, coarse filtration of a fluid passing through it.

The primary filter structure may comprise a plurality of first elements spaced apart a distance greater than the diameter of the at least one orifice of the outlet. The first elements may be arranged to obstruct the flow of fluid such that the primary filter structure provides a flow resistance that is substantially lower than a flow resistance of the at least one orifice of the outlet. The first elements may be arranged with a staggered configuration whereby to define a plurality of meandering flow paths for the fluid. The spacing between the first elements of the primary structure may decrease in the downstream direction.

The primary structure may comprise first elements having as at least one of the following cross-sectional shapes: a horse-shoe; semicircle; chevron; circular; hexagonal; rectangular; square; triangular; star or wing.

The one or more openings in the first elements of the primary structure may be arranged such that they get progressively thinner in the downstream direction, for example such that elements are smaller on the outlet side than on the inlet side. The primary filter structure may comprise a plurality of first elements arranged to extend transversely to direction of fluid flow.

The secondary filter structure may comprise a plurality of second elements, preferably wherein the plurality of second elements are spaced together a distance less than the hydraulic diameter of the at least one orifice of the outlet.

The second elements of the secondary filter structure may define a plurality of through-flow channels, preferably wherein a hydraulic diameter of the largest channel in the direction transverse to the direction of fluid flow is smaller than the narrowest of the flow paths defined by the primary filter structure.

The second elements in secondary structure may be spaced apart a distance smaller than the hydraulic diameter of said at least one orifice of the outlet.

The first and/or second elements may comprise one or more rows of projections. The primary and secondary filter structures may, at least partially, overlap.

The first and/or second elements in the primary and/or secondary filter structure(s) may be arranged to extend the entire width of the nozzle in a direction substantially transverse to the direction of fluid flow.

The micro-nozzle may further comprise a base plate, wherein the first and/or second elements are arranged to project from the base plate. The micro-nozzle may further comprise a cover plate, preferably wherein the base plate and cover plate are joined together in an opposed configuration.

The first and/or second elements may be arranged to extend between the base plate and the cover plate, preferably wherein said first and/or second elements contact the cover plate, preferably such that the cover plate provides a fluid impenetrable contact with the elements.

The first elements may be spaced apart a distance between about 0.003 mm and about 0.2 mm. A maximum hydraulic diameter of a channel defined by the first and second elements of the primary and secondary filters may be between about 0.005 mm and about 0.05 mm, and preferably between about 0.005 mm and about 0.02 mm. A cross-sectional dimension of the first and/or second elements of the primary and/or secondary filter(s) may be between about 0.005 mm and about 0.02 mm.

By providing a primary filter structure with filter elements which are spaced apart at distances larger than a contaminant particle diameter, it is possible to provide a filter which does not substantially limit the flow of fluid. In other words, the primary filter structure provides a filter having a low flow resistance. The secondary filter structure is arranged to provide a barrier to capture any contaminant particles which remain after the fluid has flown through the primary filter structure. The two-stage filtration system allows the nozzle to provide compact filtration in a nozzle, which does not substantially limit fluid flow.

The ability to provide a high-quality, compact filtration within a nozzle is particularly important in microscopic systems. The nozzle may be a microscopic nozzle. In such cases, the outlet of the nozzle may comprise one or more apertures, and the apertures may be between 0.003 and 0.2 mm in hydraulic diameter.

The low flow resistance of the nozzle is particularly important in high pressure applications. The nozzle is preferably arranged to receive fluids at pressures between 0.1 MPa to 50 MPa (i.e. 1 bar to 500 bar).

According to one aspect, nozzle and filter structures are created in plates which are bonded together. According to another aspect, nozzle and filter structures are formed from elements projected from a, preferably flat, base plate, with a second plate acting as a, preferably flat, cover plate. It may be advantageous for the cover plate to form a fluid-impenetrable contact with the top surface of all elements projected from the base plate.

According to another aspect, elements forming the primary filter structure, independent of the shape and size of these elements, may be arranged in a regular or irregular pattern, whereas the spaces between the elements are sufficiently large for a primary structure to have a flow resistance substantially lower than the flow resistance of the nozzle. Alternatively, elements in the primary filter structure may be arranged in a pattern, such that an element located downstream of two elements arranged substantially perpendicular to the main flow direction is located opposite the space between them. In another alternative, the spaces between the elements of the primary filter structure decrease in the downstream direction.

The secondary filter structure may comprise one or more rows of projections. The spaces between projections in the secondary filter structure are preferably sufficiently small to capture any particles that escape through a primary filter structure and which are small enough to block the nozzle.

Elements of the primary filter structure may have a horse-shoe or semicircle shape. Alternatively, elements of the primary structure may have a chevron shape, or may be formed from circular, hexagonal, rectangular, square, triangular, star or wing shaped elements. In arrangements where the elements have a preferential direction, i.e. horse-shoe or chevron, the elements can be arranged in the same, alternating or essentially random direction. When filter elements have an inner capacitance, i.e. horse-shoe, chevron etc., particles can be trapped inside the elements instead of the gaps between the elements. In arrangements where filter elements have a star shape, an effective trapping surface area on an element increases relative to a trapping surface area of a smooth wall shaped element of similar area - circular, square, etc. These improvements further increase filter capacity without increasing the overall size of the filter.

The elements in the primary filter structure may be obstructive, in a sense that they don't allow a through-flow of a liquid. Alternatively, the elements in the primary structure may be open, in a sense that a liquid can flow through them. It is advantageous to arrange the elements in the primary structure to have one or more openings. In another alternative, the one or more openings in elements of the primary structure may be arranged to be thinner in the downstream side of the projection than in the upstream side. Having open filter elements may increase the probability of trapping particle inside an element since a flow lines carrying particles go through the elements.

According to another aspect, filter elements may comprise of one or more sub-elements. A sub-element might be circular, rectangular, square, triangular or semi-circular. In alternative embodiments, the elemental shape might be a star, wing, horse-shoe or a chevron. The composite shape might have the same, similar or different shape to the shape of a single element of which it is comprised.

According to another aspect, composite elements in the primary filter structure may be obstructive in a sense that they don't allow a through-flow of a liquid. In an alternative, the composite elements in a primary structure are open, in a sense that a liquid can flow through them. It may be advantageous to arrange the elements in a primary structure to have one or more openings. In an alternative, the one or more openings in the elements of the primary filter structure may be arranged to be smaller size on the outlet side than on the inlet side.

The primary filter structure may cover the entire width of the filter. The secondary filter structure may cover the entire width of the filter.

The one or more individual first elements comprising the primary structure may be arranged such that a diameter of a largest circle fitting within a shape defined by a cross-section of an element in the direction extending from a base plate transversely to the flow is between 0.003 mm and 0.2 mm.

The one or more individual first elements comprising the primary structure may be arranged such that a diameter of a smallest circle within which a shape defined by a cross-section of an element in the direction extending from a base plate transversely to the flow can be fitted is between 0.003 mm and 0.2 mm.

The one or more individual elements comprising the primary structure may define a flow blocking element. The one or more individual first elements comprising the primary structure may define a flow permeable element.

The one or more individual first elements may be arranged such that a diameter of a largest circle fitting within a shape defined by a cross-section of an element in the direction extending from a base plate transversely to the flow is between 0.003 mm and 0.2 mm.

The one or more individual elements may be arranged such that a diameter of a smallest circle within which a shape defined by a cross-section of an element in the direction extending from a base plate transversely to the flow can be fitted is between 0.003 mm and 0.2 mm.

The hydraulic diameter in one or more of the through-flow channels in permeable elements of the primary structure may be between 0.003 mm and 0.1 mm.

The one or more individual elements of the primary structure may comprise a sub-structure formed by two or more elements. The two or more elements of the sub-structure may be arranged to form one of the afore-mentioned shapes. The spacing between the two or more elements may define a through-flow channel with hydrodynamic diameter of 0.003 mm to 0.2 mm.

The one or more individual sub-elements of the substructure may be arranged such that a diameter of a largest circle fitting within a shape defined by a cross-section of an element in the direction extending from a base plate transversely to the flow is between 0.003 mm and 0.2 mm.

The one or more individual sub-elements of the substructure may be arranged such that a diameter of a smallest circle within which a shape defined by a cross-section of an element in the direction extending from a base plate transversely to the flow can be fitted is between 0.003 mm and 0.2 mm.

The "second" elements in the secondary filter structure may be arranged side by side across the entire widths of the filter. The elements in the secondary filter structure may be arranged side by side in one or more tires.

The use of the phrase "substantially" as a qualifier of certain features or effects throughout this disclosure, is intended to simply mean that any deviations are within tolerances that would normally be expected by the skilled person in the relevant field.

As used herein, "nozzle" preferably connotes a component or a part of a component containing one or more orifices through which a liquid pushed by a mechanical system for aerosolising liquid exits the device.

As used herein, "filter" preferably connotes a component or a part of a component containing a structure in which any particles contained in a liquid pushed by a mechanical system for aerosolising liquid are trapped before reaching the nozzle.

As used herein, "micro-structure" preferably connotes a structure with dimensions ranging from 0.1 µm to sub-millimetre.

As used herein, "upstream" preferably connotes a direction defined by a surface containing an inlet and a surface containing an outlet from the inlet to the outlet. Thus, "downstream" preferably connotes an opposite direction.

Any apparatus feature described herein may be provided as a method feature, and vice versa. Furthermore, as used herein, means plus function features may be expressed alternatively in terms of their corresponding structure.

Moreover, it will be understood that the present invention is described herein purely by way of example, and modifications of detail can be made within the scope of the invention. For example, any feature in a particular aspect described herein may be applied to another aspect, in any appropriate combination. It should also be appreciated that particular combinations of the various features described and defined in any aspects described herein can be implemented and/or supplied and/or used independently.

BRIEF DESCRIPTION OF THE DRAWINGS

Embodiments and aspects of the present invention will now be described in detail, by way of example only, with reference to the following figures, in which.

DETAILED DESCRIPTION

Figure 1:
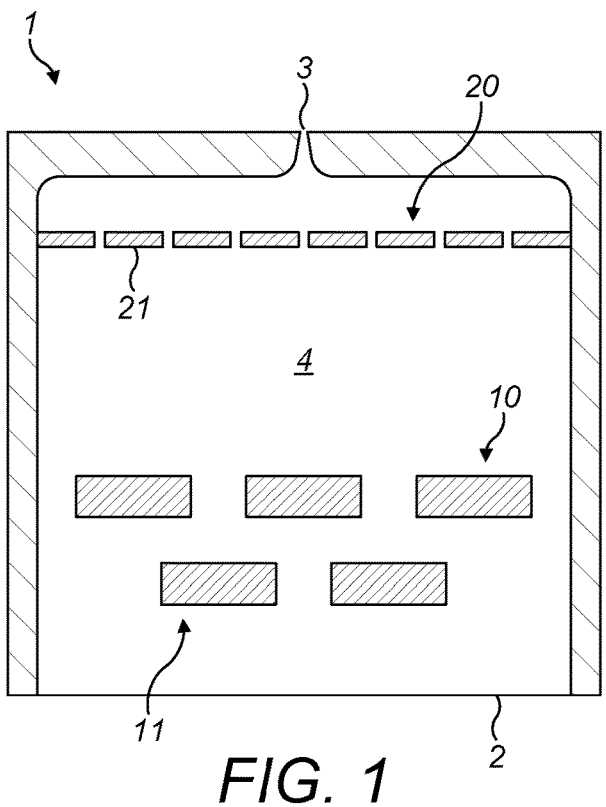
FIG. 1 schematically illustrates an example micro-nozzle in an open configuration.

An example nozzle 1 is generally illustrated in an open configuration in FIG. 1. The nozzle 1, shown in FIG. 1 in a top-down view, comprises an inlet 2, an outlet 3 and a base surface 4. The nozzle also comprises a primary filter structure 10 and a secondary filter structure 20. Although FIG. 1 shows the nozzle 1 in an open configuration, the nozzle 1 is completed by covering the components shown with a cover surface, which matches the planar dimensions of the base surface 4 to form a fluid-tight volume.

The inlet 2 is arranged at one end of the nozzle 1, and comprises an opening to allow, in use, fluid to enter the nozzle 1. In this example, the inlet 2 is a multi-channel inlet. By 'multi-channel' we intend to mean that the inlet 2 comprises a one or more slots forming channels 2a. In other examples, the inlet 2 comprises a single aperture through which the fluid is arranged to flow in to the nozzle 1. In use, the multi-channel inlet 2 is arranged to receive fluid from an external source, and allow the fluid to enter the nozzle 1 through the channels 2a. As fluid flows in to the nozzle 1, the multi-channel inlet 2 acts as a coarse filter. For example, the slots of the inlet 2 can obstruct and remove contaminants which have a diameter comparable to the width of the nozzle 1.

The outlet 3 is arranged at another end of the nozzle 1. In this example, the outlet 3 is arranged opposite to the inlet 2. The outlet 3 comprises an opening to allow, in use, fluid to exit the nozzle 1. In this example, the outlet 3 comprises a single aperture 3a. In other examples, the outlet 3 can comprise a number of openings each arranged to allow fluid to exit the nozzle 1. The outlet 3 can comprise a chamfer or a taper, arranged to collimate the outgoing flow of fluid. In some examples, the outlet 3 can comprise a valve or a stopper, arranged to allow a user to obstruct the one or more openings of the outlet 3, so as to prevent the flow of fluid out of the nozzle 1.

The inlet 2 and the outlet 3 define the direction of flow of fluid through the nozzle 1. In particular, the flow direction is defined as the direction from the inlet 2 to the outlet 3. In this example, the straight line joining the inlet 2 and the outlet 3 defines a longitudinal axis of the nozzle 1.

In this example, the nozzle comprises a substantially rectangular base surface 4. Although not shown in FIG. 1, a wall extends, in a direction perpendicular to the plane of the figure, from each edge of the base surface 4 such that the nozzle 1 has two opposing side walls enclosed by front and back walls which oppose each other. In this example, the inlet 2 is disposed on the front wall, while the outlet 3 is disposed on the back wall. In other examples, the base 4 can take other shapes. Examples include triangular, rhombus, circular, semi-circular. Some of the walls may be distorted to provide certain effects. For example, the back wall may be tapered to the outlet 3 to improve fluid flow out of the nozzle 1.

The primary filter structure 10 is positioned downstream of the nozzle inlet 2. The primary filter structure 10 comprises a plurality of "first" filter elements 11 projected from the base surface 4. In the example of FIG. 1, the filter elements 11 are substantially rectangular in cross section. The filter elements 11 extend from the base surface 4 in a direction perpendicular to the plane of the figure, and extend to substantially the same height as that of the nozzle 1 walls. In use, the filter elements 11 are arranged to present an obstruction in the flow path of fluid between the inlet 2 and the outlet 3.

The primary filter structure 10 is arranged to filter out contaminant particles utilising a principle known as statistical filtration. In statistical filtration, a filter traps particles carried by a flow of liquid passing through meandering flow channels defined by elements in the filter structure. The probability of trapping a particle increases the longer the particle stays in the filter structure, due to the action of the filtered particles being captured in channels of the filter. Such a mechanism therefore traps particles in the volume of the filter.

In the example shown in FIG. 1, the primary filter structure 10 is arranged to capture contaminant particles in the flow path meandering around the filter elements 11. The particles may agglomerate in the spaces between filter elements 11, or on the various surfaces of each filter element 11.

Figure 2:
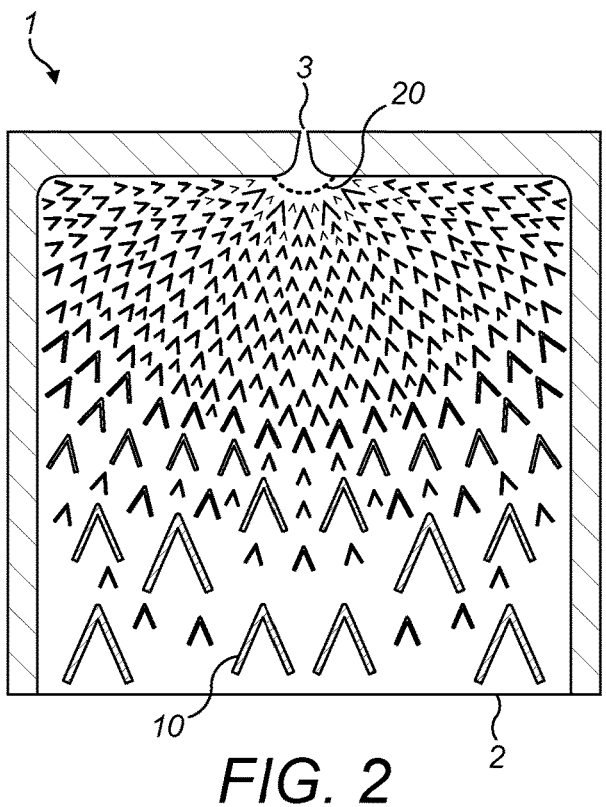
FIG. 2 schematically illustrates another example micro-nozzle in an open configuration.

Whilst in this example, the filter elements 11 are substantially rectangular in cross-section, in other examples, the filter elements 11 are arranged to capture contaminant particles within their volume. In the example shown in FIG. 2, for example, the filter elements 11 are substantially V-shaped. By V-shaped' we of course intend to mean having the shape of a capital letter 'V'. For example, such a shape takes the form of two straight edges tapered to join at an apex. The filter elements 11 are arranged so that the apex of the V-shape is arranged pointing toward the outlet 3. In other words, the edges of each of the filter elements 11 are tapered in the direction of fluid flow. In use, such an arrangement allows each individual filter element 11 to capture, within its volume, one or more contaminant particles carried in the fluid passing through the primary filter structure 10.

The lateral distance between elements 11 is arranged to be greater than the diameter of the contaminant particles. By 'lateral', we of course intend to mean the direction perpendicular to the longitudinal direction. This allows the primary filter structure 10 to have a flow resistance substantially lower than that of the nozzle outlet 3, whilst fulfilling the function of filtering contaminant particles.

Primary filter elements 11 formed along a lateral cross section of the nozzle 1 can be said to form a row 12 of filter elements 11. As can be seen in FIG. 1, each row 12 of filter elements can be arranged to have a staggered arrangement of filter elements 11 with respect to the adjacent rows of filter elements 11, such that the rows define a meandering flow path, which the fluid is forced to take when fluid flows through the primary filter structure 10.

The secondary filter structure 20 is positioned downstream of the primary filter structure 10, and upstream of the nozzle outlet 3. The secondary filter structure 20 comprises a plurality of "second" filter elements 21 projected from the base surface 4.

The secondary filter structure 20 is arranged to filter out contaminant particles utilising a process known as absolute filtration. An absolute filtration mechanism is based on stopping contaminant particles on a surface of a filter by setting the maximum hydraulic diameter of the filter elements to be smaller than the maximum size of a particle allowed to pass through the filter.

Similar to the primary filter structure 10, secondary filter elements 21 formed along a lateral cross section of the nozzle 1 can be said to form a row 22 of filter elements 21.

In the example shown in FIG. 1, the secondary filter structure comprises a single row 22 of filter elements 21.

The lateral distance between secondary filter elements 21 is arranged to be less than the diameter of contaminant particles. In other words, the spaces between the elements 21 perpendicular to the flow direction, are sufficiently small to capture any particles that escape through the primary filter structure 10.

Whereas the primary filter structure 10 filters the fluid flowing through its volume to capture contaminant particles within its volume, the secondary filter structure 20 is arranged to provide one or more barriers, to capture contaminant particles at one or more surfaces of the secondary filter elements 21.

Whilst in the example described above, the filter elements 11, 21 are arranged in structured rows, the filter elements 11, 21 may be arranged in any variation of regular or irregular patterns. For example, in FIG. 2, the primary filter elements 11 are arranged in concentric rings about the outlet 3, and the secondary filter elements 21 are arranged in a semi-circle about the outlet 3.

Figure 3:
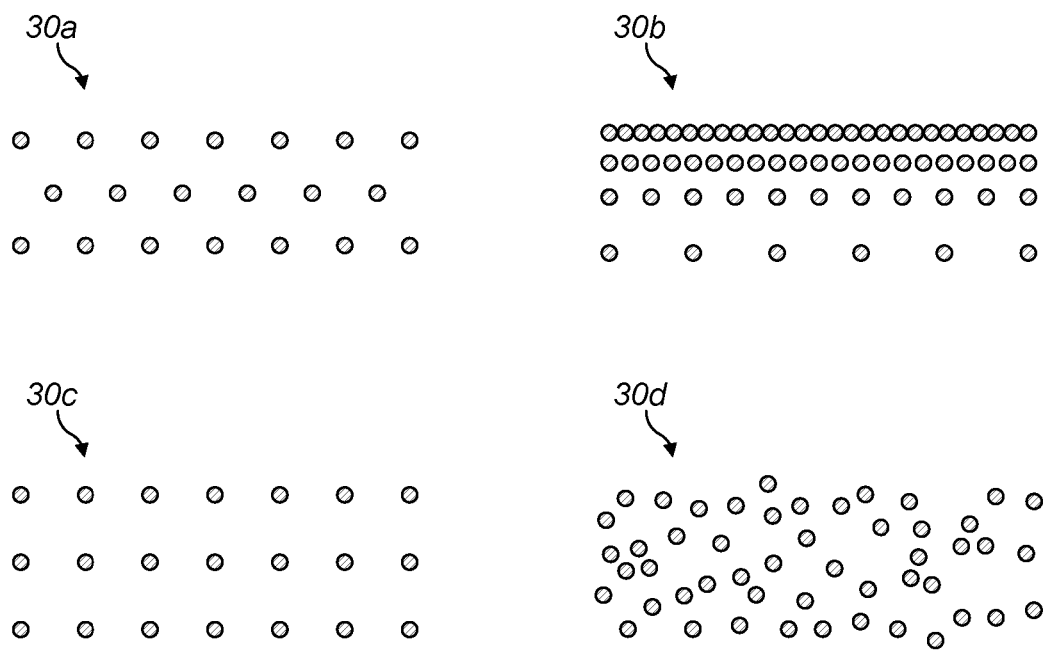
FIG. 3 schematically illustrates arrangements of elements in a primary filter structure of an example micro-nozzle.

FIG. 3 schematically illustrates various arrangements of primary filter elements 11. These are shown as dots, regardless of the shape and size of the individual filter elements 11. The primary filter elements 11 can be arranged in a regular pattern, having rows of filter elements 11 arranged such that each row is substantially same or similar to the adjacent rows (illustrated at 30*c*). Alternatively, the regular pattern may comprise patterns in which a filter element located downstream of two elements adjacent in the lateral direction is located opposite the gap between them. In such a pattern, each row can be said to be staggered with respect to the rows adjacent to it (illustrated at 30*a*).

In alternative primary filter patterns, lateral gaps between elements can be decreasing in the downstream direction (illustrated at 30*b*). Other primary filter patterns exist in which the lateral gaps between elements are increasing in the downstream direction.

The arrangement of filter elements can also be irregular (illustrated at 30*d*).

The arrangement of filter elements 11 may take the form of any pattern, or any combination of patterns described above. The examples described above in relation to the position of the primary filter elements 11 can equally be applied to the secondary filter elements. However, the secondary filter structure 20 is arranged to operate using absolute filtration mechanisms, which means that a meandering flow path is generally not required in the secondary filter structure 20.

Figure 4:
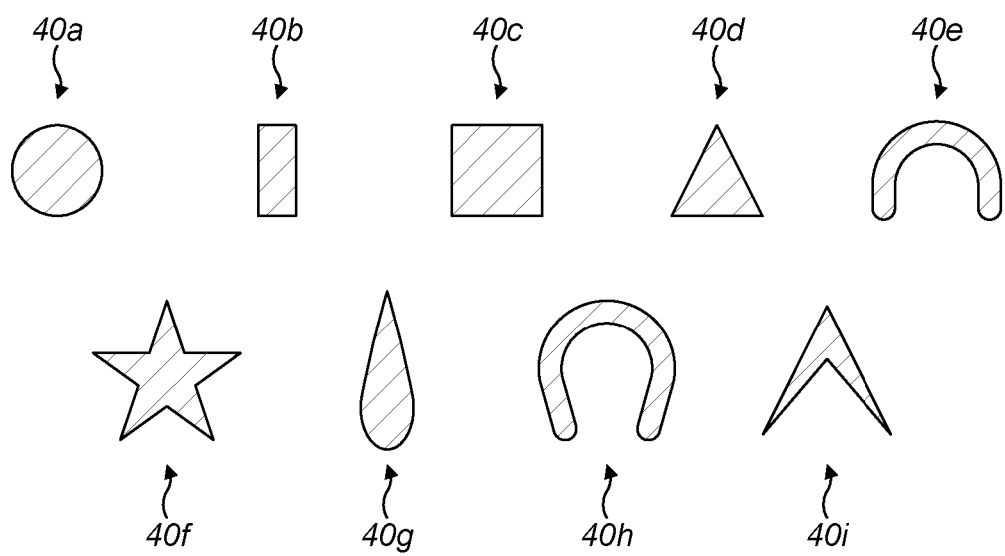
FIG. 4 schematically illustrates examples of elements in a primary filter structure of an example micro-nozzle.

Whilst various examples have been described above with primary filter elements 11 having rectangular and V-shaped cross-sections, the filter elements 11 can have a wide range of shapes and sizes, which have been found to be effective for use in the primary filter structure 10. A number of examples have been illustrated in FIG. 4: circle 40*a*, rectangle 40*b*, square 40*c*, triangle 40*d*, semi-circular 40*e*, star-shaped 40*f*, wing-shaped 40*g*, horse-shoe shaped 40*h*, or chevron-shaped 40*i*.

The cross-sectional shape may be chosen to allow the filter element to have a 'pocket' in its volume, such that in use, the filter element 11 is able to capture contaminant particles within its volume. In other words, contaminant particles flowing through the structure can become trapped inside elements having an inner capacitance. Examples of such shapes include the semi-circular 40*e*, horse-shoe shaped 40*h*, and chevron-shaped 40*i* filter elements 11.

The cross-sectional shape of the filter elements 11 may also be chosen or arranged so as to increase its surface area, or to increase the number of vertices. An example of such a shape is the star-shaped 40*f* filter element 11.

In examples where the elements have a preferential direction (e.g. horse-shoe or chevron-shaped), the elements can be arranged in the same, alternating or random direction.

The examples detailed above provide improvements to further increase filter capacity without increasing the overall size. In general, the primary filter structure 10 can comprise filter elements 11 having cross-sections of any shape. In some examples, the primary filter structure 10 comprises a mixture of filter elements 11 having different cross-sectional shapes.

Whilst examples have been described in relation to the filter elements 11 in the primary structure 10, the shapes can equally be applied to the filter elements 21 in the secondary structure 20.

The elements 11 in the primary structure 10 are generally obstructive, meaning that they do not allow a through-flow of a fluid. In some examples, the filter elements 11 of the primary structure 10 are arranged to provide sub-channels through which the fluid can flow. In order to achieve such an effect, the filter elements 11 can have an aperture therethrough. Alternatively, the filter elements 11 can be composed of smaller elements having the same or a different cross-sectional shape. For example, a horse-shoe shaped element may be comprised of smaller elements each arranged to form a general outline of the horse-shoe shape.

In the case that the filter elements 11 are composed of smaller elements, each of the filter elements can be said to be a 'composite element' comprising 'sub-elements'. Of course, all of the arrangements and optional features described above in respect of simple uniform filter structures can equally apply to the case when each filter element is a composite element comprising sub-elements.

Figure 9A:
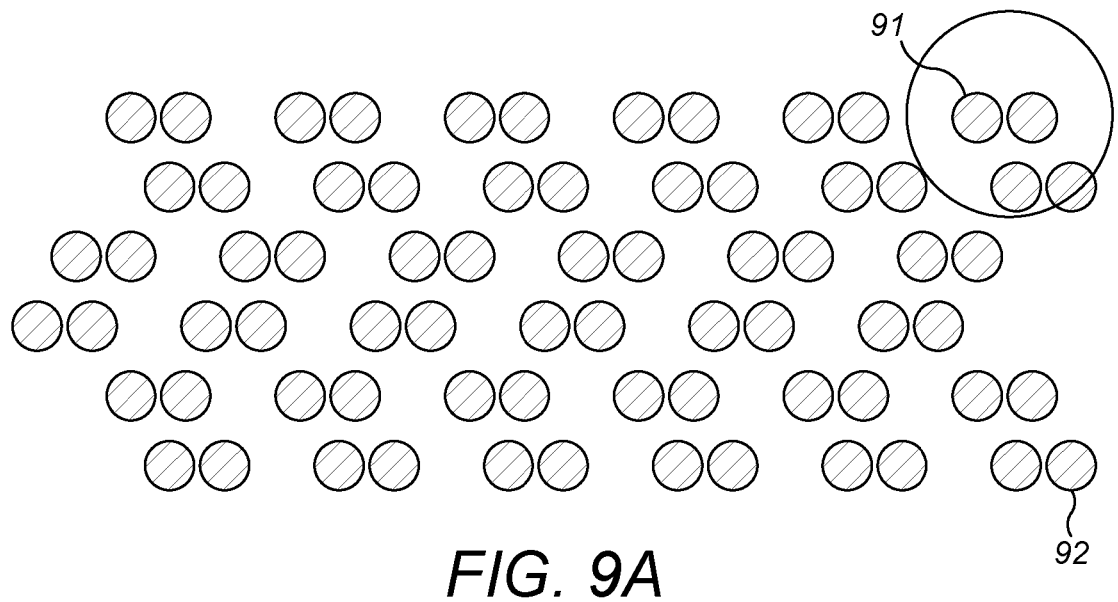
FIG. 9A schematically illustrates an example arrangement of elements in a filter structure of an example micro-nozzle.

FIG. 9A illustrates an example implementation of a filter structure 90 having composite filter elements 91. The composite elements of this filter structure can be used as elements of a primary structure 10 in FIG. 1. Alternatively, or in combination, the same principles can also be applied to elements of a secondary structure 20 in FIG. 1.

The filter structure 90 in the example illustrated in FIG. 9A is formed of filter elements 91. Each filter element 91 comprises sub-elements 93 which together form the filter element 91. The sub-elements 93 shown in FIG. 9A are a pair of projections, each projection being a substantially cylindrical projection from the base of the filter. Of course, the sub-elements can take other shapes or forms and a number of examples of alternative forms are described below. In FIG. 9A, it can be seen that the composite filter elements 91 are arranged in staggered rows 92, similar to the example structure 30*a* described in FIG. 3. The difference here is that each filter element is a composite element comprising laterally arranged sub-elements. Whilst in other examples the spacing between sub-elements and the spacing between adjacent composite elements can be equal, it can be seen that in this example the lateral spacing between the sub-elements 93 in each composite element 91 is different to the lateral spacing between successive composite elements 91.

The spacing between each sub-element 93 within a composite element 91 can be chosen to be smaller than the particle diameter of contaminants to be captured and/or filtered by the filter element 90, and the spacing between adjacent composite elements 91 in the row 92 can be chosen to be larger than the contaminant particle diameter. The effect of choosing such a spacing regime is that the filter structure 90 is able to catch and filter contaminant particles in the gaps between sub-elements 93, and is able to also allow relatively free flow in the gaps between composite elements 91. This means the filter element 90 is able to effectively capture and filter contaminant particles without substantially reducing the overall flow through the filter 90.

Figure 9B:
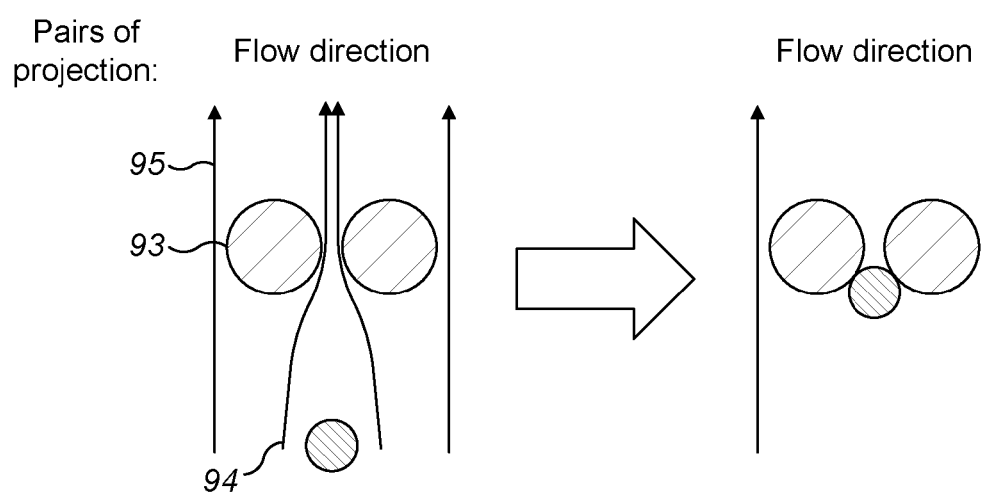
FIG. 9B schematically illustrates an example fluid flow through the example arrangement of FIG. 9A.

FIG. 9B provides a close-up illustration of a selected composite filter element 91. The figure illustrates a pair of filter element projections (sub-elements) which together form the filter element 91. A first set of arrows 94 illustrate the fluid flow path between the sub-elements 93 of the composite element 91, and a second set of arrows 95 illustrate the fluid flow path between adjacent composite elements 91. It can be seen that, as the contaminant particle approaches the composite element 91, the flow 94 between the pair of projections is faster than the flow 95 beside the pair, generating a locally low pressure region. This encourages the contaminant to flow towards the pair. The pair of projections enables effective particle capture while allowing flow 95 to flow around the dual projections even when the gap between the sub-elements is blocked or partially blocked due to the contaminant capture. This allows the filter structure 90 to operate effectively without a substantial increase in flow resistance, thus allowing improved filtration whilst maintaining fluid flow.

Figure 10A:
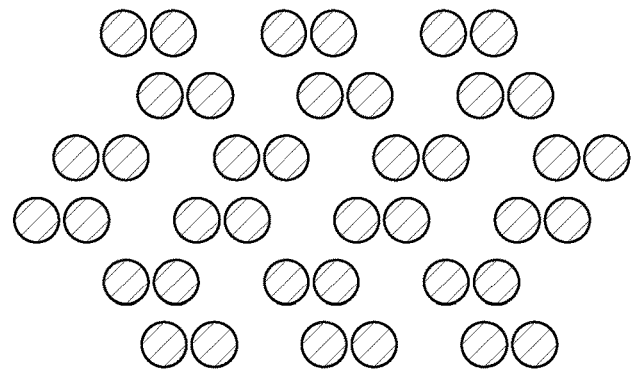
FIG. 10A schematically illustrates an example arrangement of elements in a filter structure of an example micro-nozzle.
Figure 10B:
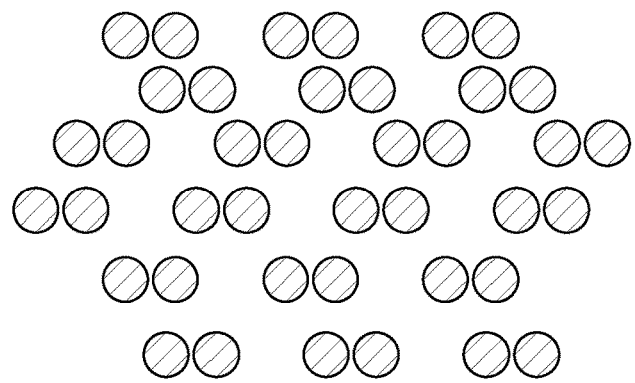
FIG. 10B schematically illustrates an example arrangement of elements in a filter structure of an example micro-nozzle.
Figure 10C:
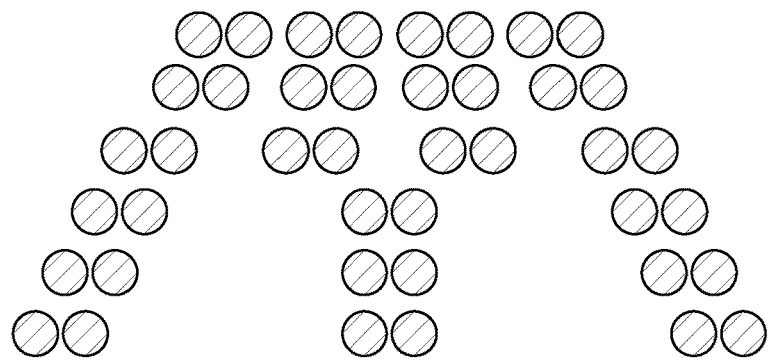
FIG. 10C schematically illustrates an example arrangement of elements in a filter structure of an example micro-nozzle.

As already noted, the example of FIG. 9A comprises composite elements 91 arranged in staggered rows 92. Other arrangements of composite elements 91 are also possible. For example, FIGS. 10A to 10C illustrate a number of exemplary arrangements of composite elements 91. The arrangement shown in FIG. 10A has rows of equally spaced pairs in alternating arrangements so as to create a regular zig-zag path. The arrangement shown in FIG. 10B has a gradually decreasing row-wise separation with a pre-defined distribution. That is, the separation between adjacent rows decreases with each row. The pre-defined distribution can, for example, be an exponential distribution assuming that contaminant diameters are normally distributed (which is a member of the exponential distribution family).

The arrangement shown in FIG. 10C has gradually decreasing column-wise separation with pre-defined distribution. That is, the lateral separation between adjacent composite elements decreases with each row. The pre-defined distribution can potentially bias the filter to clog up at a specific column-wise (lateral) location to minimise disturbance to the fluid flow.

Whilst the above examples of composite elements have the sub-elements arranged such that contaminant particles are arranged to be trapped within the composite features (i.e. between the sub-elements of each composite element), the composite elements can be arranged to trap particles in the gaps between the composite elements. Contaminant particles can be trapped in the gaps that exist between composite elements or between sub-elements within each composite element. The trapping characteristics of the filter element can be controlled in design by adjusting the separation between each composite element, and the separation between the sub-elements of the composite element.

In some examples, the composite elements are arranged to trap particles in the gaps between elements or sub-elements of adjacent rows.

For simplicity, the above examples have been described having composite elements arranged in linear rows. In other examples the composite elements can be arranged in any pattern designed to improve trapping of contaminants and/or improve fluid flow through the filter. These patterns themselves may be repeated to form groupings of patterned elements, the groupings themselves forming a pattern.

The above examples have been illustrated, for simplicity, having sub-elements that are substantially cylindrical. That is, the cross section of each sub-element is circular. Sub-elements having other shapes are also contemplated.

Figure 5:
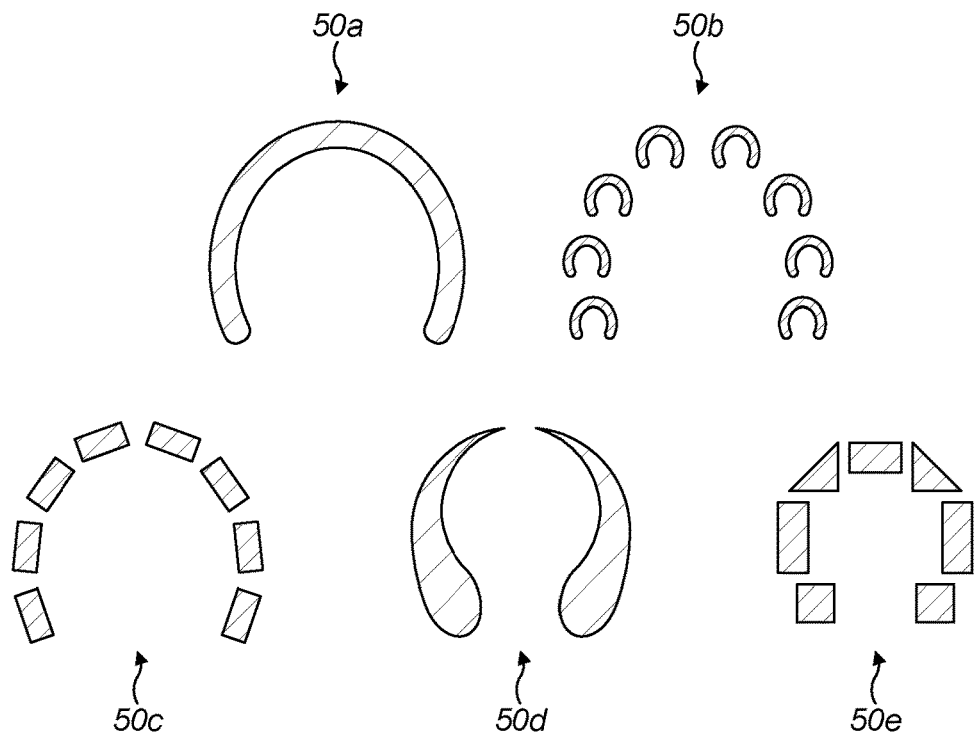
FIG. 5 schematically illustrates examples of a horse-shoe arrangement of a primary filter structure of an example micro-nozzle.

Of course, it is feasible to construct a filter structure using the principles of FIGS. 9 and 10 such that the primary structure, comprising composite elements, provides sufficient filtration without the need for a secondary, absolute filter. Such an embodiment, whilst lacking the intrinsic guarantee of absolute filtration, provides simplicity of design and construction and yet can provide adequately robust filtration for certain applications FIG. 5 illustrates examples of possible implementations of a horse-shoe composite element: horse-shoe composite structure 50a comprising exactly one horse-shoe element, horse-shoe composite element 50b comprising more than one horse-shoe elements, horse-shoe composite element comprising several rectangular elements 50c, horse-shoe composite element comprising two wing-shaped elements 50d. The sizes, types and orientations of individual elements comprising the composite elements can be the same (as illustrated at 50b), or vary within a single composite element: in an example, a composite element is made of triangles, squares and rectangles (as illustrated at 50e).

Figure 6:
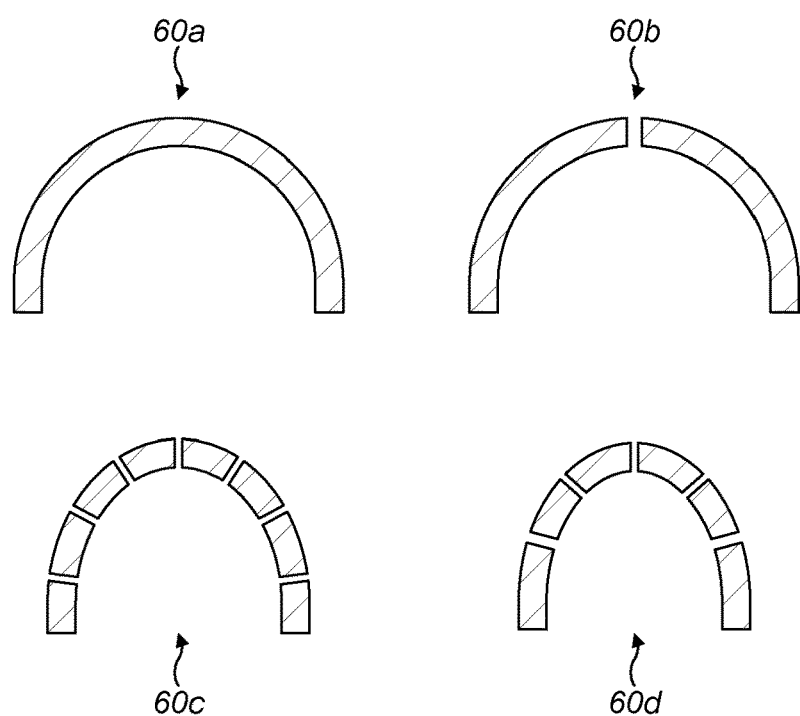
FIG. 6 schematically illustrates examples of a semi-circular arrangement of a primary filter structure of an example micro-nozzle.

FIG. 6 illustrates examples of possible implementations of a semi-circular composite element. The element may be substantially obstructive 60a, open with exactly one opening 60b, with a plurality of openings of the same width 60c, or with a plurality of openings of different widths 60d.

Figure 7:
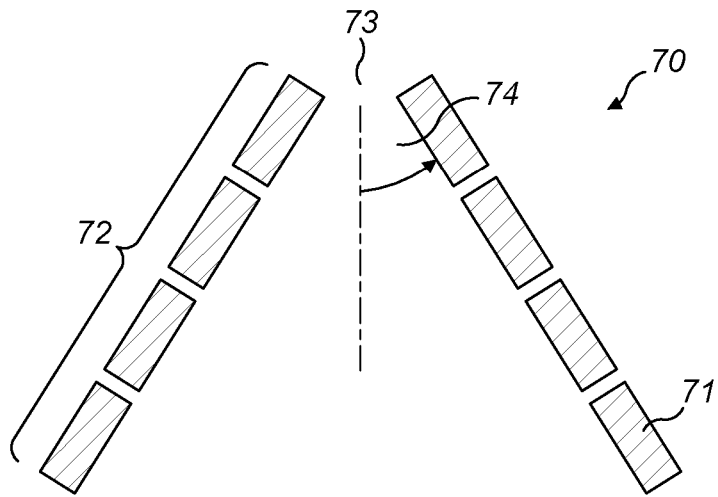
FIG. 7 schematically illustrates examples of a chevron-shaped arrangement of a primary filter structure of an example micro-nozzle.

FIG. 7 illustrates a detailed example of a possible implementation of a chevron-shaped composite element 70 comprising rectangular elements 71. Multiple rectangular elements with small gaps between them create walls 72 of the chevron-shaped composite element 70. The wall length and tip angle 74 influences the flow resistance of the element. The tip width 72 determines what particle size will pass through the composite element 70.

Figure 8:
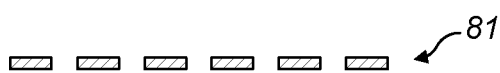
FIG. 8 schematically illustrates examples of arrangement of elements in a secondary filter structure of an example micro-nozzle.
Figure 8:
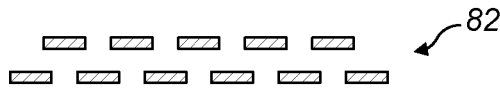
Figure 8:
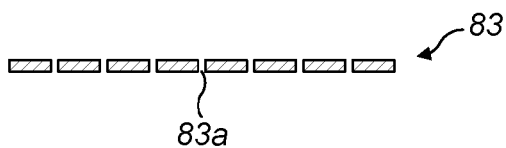

FIG. 8 shows different embodiments of a secondary filter structure. Elements of a secondary filter structure are shown as flat line segments regardless of the shape of individual elements. The secondary structure may comprise one (81) or more rows (82) of be arranged in patterns described in FIG. 3. In a different example (83), the gaps (83 a) between projections are small enough to capture contaminants that passed through the primary filter structure.

It will be understood by a skilled person that the present invention has been described above purely by way of example, and modifications of detail can be made within the scope of the invention. Thus, while the foregoing is directed to exemplary embodiments of the present invention, other and further embodiments of the invention will be apparent to those skilled in the art from consideration of the specification, and may be devised without departing from the basic scope thereof, which is determined by the claims that follow.

The invention claimed is:

1. A micro-nozzle with an integrated filter structure for receiving fluids at pressures between 0.1 MPa to 50 MPa, comprising:
    at least one fluid inlet;
    a fluid outlet comprising at least one orifice; and
    a primary filter structure positioned downstream from the at least one fluid inlet and arranged to provide statistical filtration of fluid passing therethrough, the primary filter structure comprising a plurality of first elements spaced apart a distance greater than a diameter of the at least one orifice of the outlet,
    wherein each of the first elements comprises a plurality of sub-elements which are laterally spaced apart a distance less than the distance at which the plurality of first elements is laterally spaced apart,
    wherein the first elements are arranged with a staggered configuration whereby to define a plurality of meandering flow paths for the fluid,
    wherein the distance between the plurality of sub-elements is configured to generate a lower pressure region between the plurality of sub-elements relative to a pressure between adjacent first elements.

2. The micro-nozzle of claim 1 further comprising a secondary filter structure positioned downstream of the primary filter structure and arranged to provide absolute filtration of fluid received from the primary filter structure prior to the fluid reaching the fluid outlet.

3. The micro-nozzle of claim 1, wherein the at least one fluid inlet comprises a multi-channel inlet.

4. The micro-nozzle of claim 1, wherein each of the plurality of first elements is a composite element comprising a plurality of sub-elements.

5. The micro-nozzle of claim 4, wherein the sub-elements are spaced apart a distance less than the distance at which the first elements are spaced apart; and/or, wherein at least one sub-element within each first element is a staggered sub-element positioned downstream relative to another one of the sub-elements within the first element.

6. The micro-nozzle of claim 4, wherein the sub-elements are arranged within each first element such that, in use, fluid flowing through the primary filter structure experiences lower pressure at the spacing between each sub-element than at the spacing between each first element.

7. The micro-nozzle of claim 1, wherein the first elements are arranged to obstruct the flow of fluid such that the primary filter structure provides a flow resistance that is substantially lower than a flow resistance of the at least one orifice of the outlet.

8. The micro-nozzle of claim 1, wherein the spacing between the plurality of first elements of the primary filter structure decreases in the downstream direction.

9. The micro-nozzle of claim 1,
wherein each of the plurality of first elements comprises one or more openings, wherein the one or more openings in the first elements of the primary fluid structure are arranged such that they get progressively thinner in the downstream direction, for example such that the first elements are smaller on the outlet side than on the inlet side.

10. The micro-nozzle of claim 1, wherein the primary filter structure comprises plurality of first elements arranged to extend transversely to direction of fluid flow.

11. The micro-nozzle of claim 1 further comprising a secondary filter structure, wherein the secondary filter structure comprises a plurality of second elements.

12. The micro-nozzle of claim 11, wherein the second elements of the secondary filter structure define a plurality of through-flow channels, wherein a cross-section of the largest channel in the direction transverse to the direction of fluid flow is smaller than the narrowest of the flow paths defined by the primary filter structure; and/or wherein the second elements in the secondary structure are spaced apart a distance smaller than the diameter of said at least one orifice of the outlet.

13. The micro-nozzle of claim 1, wherein the primary and secondary filter structures at least partially overlap.

14. The micro-nozzle of claim 11, wherein the first and/or second elements in the primary and/or secondary filter structure(s) are arranged to extend the entire width of the nozzle in a direction substantially transverse to the direction of fluid flow.

15. The micro-nozzle of claim 11, further comprising a base plate, wherein the first and/or second elements are arranged to project from the base plate, and further comprising a cover plate, wherein the base plate and the cover plate are joined together in an opposed configuration.

16. The micro-nozzle of claim 15, wherein the first and/or second elements are arranged to extend between the base plate and the cover plate, wherein said first and/or second elements contact the cover plate, such that the cover plate provides a fluid impenetrable contact with the first and/or second elements.

17. A micro-nozzle according to claim 11, wherein:
the first elements are spaced apart a distance between about 0.003 mm and about 0.2 mm;
a maximum hydraulic diameter of a channel defined by the first and second elements of the primary and secondary filters is between about 0.005 mm and about 0.05 mm; and/or,
a cross-sectional dimension of the first and/or second elements of the primary and/or secondary filter(s) is between about 0.005 mm and about 0.02 mm.

* * * * *